United States Patent [19]

Ikeda

[11] Patent Number: 4,521,802
[45] Date of Patent: Jun. 4, 1985

[54] DOUBLE-SCANNING NON-INTERLACE COLOR TELEVISION RECEIVER

[75] Inventor: Yasunari Ikeda, Funabashi, Japan

[73] Assignee: Sony Corporation, Tokyo, Japan

[21] Appl. No.: 440,985

[22] Filed: Nov. 12, 1982

[30] Foreign Application Priority Data

Nov. 13, 1981 [JP] Japan .................................. 56-181973

[51] Int. Cl.$^3$ ............................................. H04N 9/535
[52] U.S. Cl. .................................... 358/11; 358/21 R; 358/140
[58] Field of Search .................. 358/11, 314, 140, 312, 358/21 R; 340/728

[56] References Cited

U.S. PATENT DOCUMENTS 4,142,211  11/1977  Faroudja .............................. 358/167
4,143,397  3/1979   Holmes ................................. 358/31
4,400,719  8/1983   Powers .................................. 358/11

OTHER PUBLICATIONS

Van Buul, M. C. W., et al., "Standards Conversion of a Videophone Signal with 313 Lines to a Signal with 625 Lines", Philips Research Reports, vol. 29, No. 5, pp. 413–418, 10/74.
Kaufman, M., et al., *Television Simplified*, Seventh Edition, Van Nostrand Reinhold Co., New York, 1973, p. 481.

*Primary Examiner*—Tommy P. Chin
*Attorney, Agent, or Firm*—Lewis H. Eslinger; Alvin Sinderbrand

[57] ABSTRACT

A double-scanning non-interlace color television receiver which receives an interlace color television signal having alternating odd and even fields of scanned lines which are normally interlaced, as displayed, comprises a receiver circuit which receives the interlace color television signal and includes a circuit which generates respective chroma and luminance scanning line signals in response thereto, a visual display apparatus, and a non-interlace converting circuit with a luminance double-scanning circuit which generates an averaged luminance scanning line signal from each two consecutive luminance scanning line signals of the same field, and which supplies the consecutive luminance scanning line signals and the averaged luminance scanning line signal to the visual display apparatus for display by the latter of each averaged luminance scanning line signal between the respective two consecutive luminance scanning line signals, and a circuit which supplies to the visual display apparatus color difference signals derived from the chroma scanning line signal corresponding to one of the two consecutive luminance scanning line signals for display in synchronism with the averaged luminance scanning line signal.

22 Claims, 22 Drawing Figures

FIG. 5
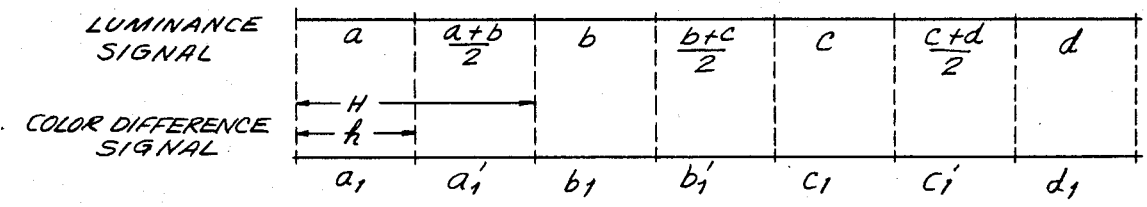
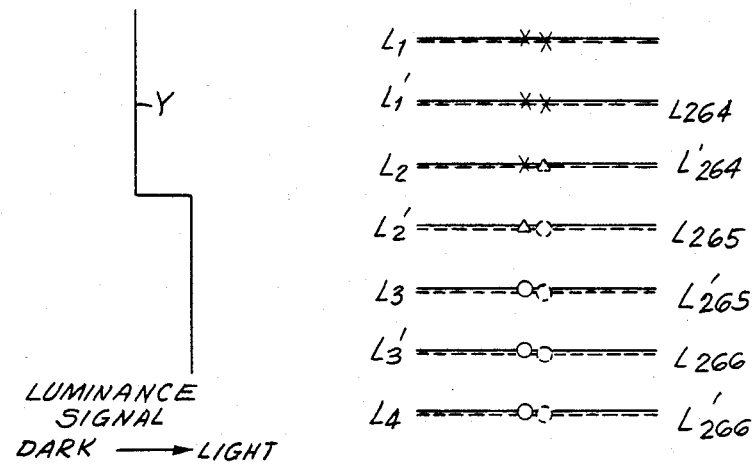
FIG. 6b  FIG. 6a
FIG. 7
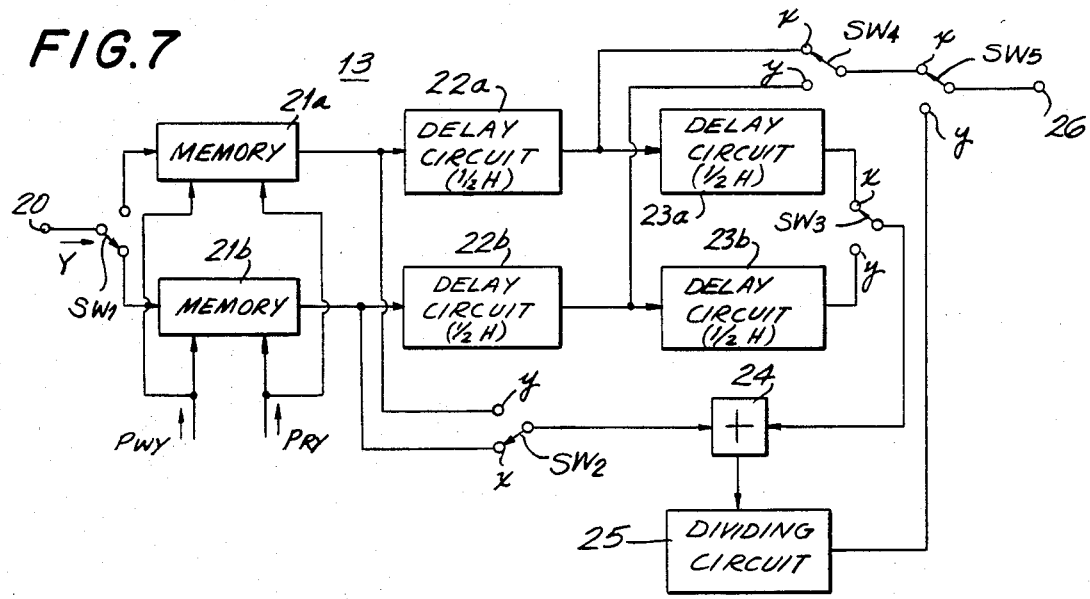

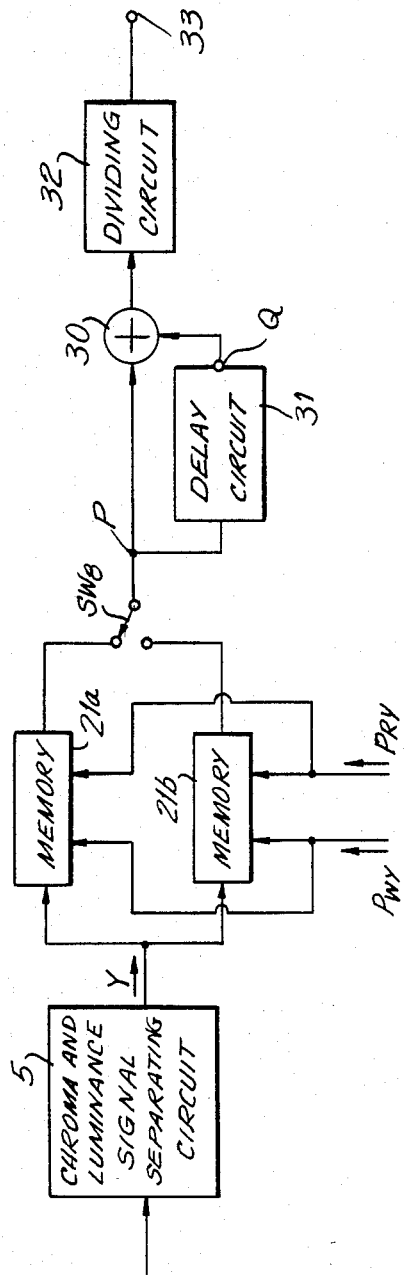

DOUBLE-SCANNING NON-INTERLACE COLOR TELEVISION RECEIVER

CROSS REFERENCES TO RELATED APPLICATIONS

Reference is made to copending applications Ser. No. 439,206, and Ser. No. 445,456, assigned to the assignee of the present application, and containing related subject matter.

BACKGROUND OF THE INVENTION

1. Field of the Invention

This invention relates to color television receivers, and more particularly, to a double-scanning non-interlace color television receiver which provides a high resolution picture on a large screen.

2. Description of the Prior Art

As the size of a picture screen of a television receiver is increased, the distance between the scanning lines increases, so that the resolution of the picture displayed thereon decreases. One proposed solution to avoid a decrease in resolution in such cases is to display the picture from a conventional television signal, which is formed of two interlaced fields of scanning lines, on a non-interlace double-scanning television system which scans every line twice. For example, each field of 262.5 scanning lines of the NTSC television system can be converted into a single frame having 525 consecutively scanned lines.

One problem with a non-interlace television receiver is the determination of the content of the scanning lines which are to be interpolated between the alternate scanning lines of the interlace television signal. The least expensive and simplest solution is to scan each line twice.

However, flicker is a serious problem in a double-scanning television receiver in which alternate lines are repeated for display. Flicker occurs when a point on a line is scanned at one brightness level in the first field and is then scanned at another, different brightness level in the second field. For example, if a point on the first scanning is dark, while the same point on the second scanning is light, flicker occurs. Flickering of the picture is objectionable and must be eliminated to achieve a high quality television picture.

OBJECTS AND SUMMARY OF THE INVENTION

It is an object of the present invention to provide a double-scanning non-interlace color television receiver which can provide a high resolution television picture without flicker.

It is another object of the present invention to provide a double-scanning non-interlace color television receiver which can suppress flicker in a television picture.

It is yet another object of the present invention to provide a double-scanning non-interlace color television receiver which can prevent a significant decrease in the resolution of a picture when the size of the picture screen is large.

It is still a further object of the present invention to provide a double-scanning non-interlace color television receiver which can be manufactured at low cost.

In accord with the present invention, a double-scanning non-interlace color television receiver for receiving an interlace color television signal having alternating odd and even fields of scanned lines which are normally interlaced, as displayed, comprises receiver means for receiving the interlace color television signal and including means for generating respective chroma and luminance scanning line signals in response thereto, visual display means, and non-interlace converting means including luminance double-scanning means for generating an averaged luminance scanning line signal from each two consecutive luminance scanning line signals of the same field, and for supplying the consecutive luminance scanning line signals and the averaged luminance scanning line signal to the visual display means for display by the latter of each averaged luminance scanning line signal between the respective two consecutive luminance scanning line signals, and means for supplying to the visual display means color difference signals derived from the chroma scanning line signal corresponding to one of the two consecutive luminance scanning line signals for display in synchronism with the averaged luminance scanning line signal.

The above, and other objects, features, and advantages of the present invention will become apparent from the following detailed description of illustrative embodiments thereof which is to be read in connection with the accompanying drawings.

BRIEF DESCRIPTION OF THE DRAWINGS

FIG. 5 is a diagram illustrating the operation of the television receiver of FIG. 4;

FIGS. 6a and 6b are diagrams illustrating the scanning lines on a television receiver in accord with the present invention, and the luminance signal supplied thereto;

FIG. 7 is a block diagram illustrating a double-scanning converting circuit for the luminance signal derived from a color television signal;

FIG. 12 is a block diagram illustrating an alternate double-scanning converting circuit for use with the luminance signal derived from a color television signal; and FIGS. 13a to 13g are timing charts illustrating the operation of the circuit of FIG. 12.

DESCRIPTION OF THE PREFERRED EMBODIMENTS

Figure 1C:
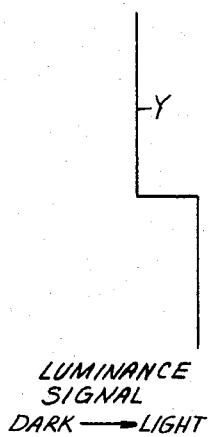
FIGS. 1a to 1c illustrate the scanning lines of an interlace television scanning system and a non-interlace television scanning system derived therefrom, and the luminance signal input thereto.
Figure 1A:
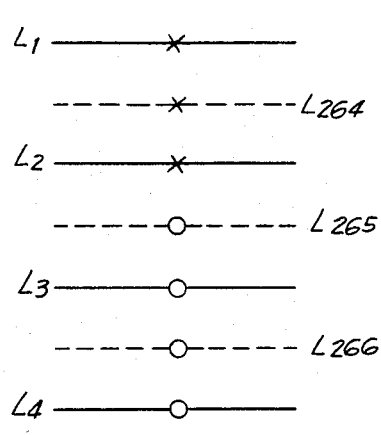

FIG. 1a illustrates the horizontal scanning lines for a prior art television receiver, with references $L_1, L_2, \ldots, L_{264}, L_{265}, \ldots$, representing the order in which the lines are scanned. The solid lines indicate the scanning lines in the odd field, while the dotted lines indicate the scanning lines in the even field.

Figure 1B:
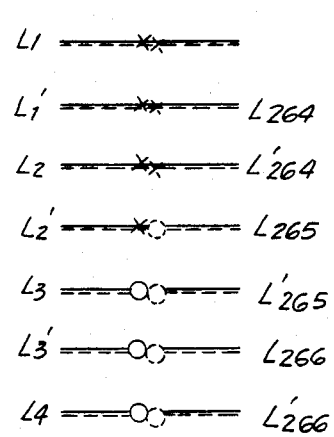

FIG. 1b illustrates the horizontal scanning lines of a double-scanning non-interlace television receiver. As in FIG. 1a, the solid lines represent the scanning lines in the odd field, while the dotted lines indicate the scanning lines of the even field. $L_1, L_2, \ldots, L_{264}, L_{265}, \ldots$ identify the scanning lines of the received interlace television signal. The scanning lines indicated by primes, $L'_1, L'_2, L'_{264}, L'_{265}, \ldots$, identify the interpolated or averaged scanning lines. During the scanning period of the odd field in a conventional television receiver, scanning lines $L_1, L'_1, L_2, L'_2, L_3, L'_3, \ldots L_{263}, L'_{263}$ are scanned consecutively in the non-interlace television receiver, so that a total of 525 lines are scanned. During the scanning period of the even field, the scanning lines $L_{264}, L'_{264}, L_{265}, L'_{265}, \ldots, L_{525}, L'_{525}$ are scanned in the non-interlace television receiver, making a total of 525 scanning lines.

Figure 2:
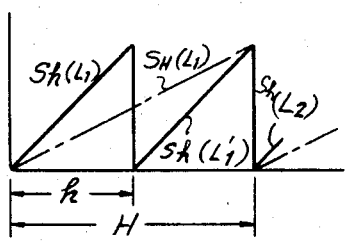
FIG. 2 is a waveform diagram of the horizontal synchronizing signals of a double-scanning non-interlace television receiver in accord with the present invention.

FIG. 2 illustrates the waveform of the horizontal synchronizing signals which perform the above-described non-interlace scanning. Reference H indicates one horizontal period of a conventional interlaced television signal (hereinafter referred to as 1H). Reference $S_H$ indicates the waveform of the horizontal synchronizing signals of a conventional television receiver (also indicated in broken lines). Reference $S_h$ indicates the waveform of the horizontal synchronizing signal for a non-interlace television receiver in accord with the present invention. It should be noted that in a double-scanning non-interlace television receiver, the scanning velocity of the electron beam is twice as fast as the scanning velocity of the electron beam in a conventional television receiver, since two lines are scanned during one 1H period. As used herein, one horizontal period of a television receiver in accord with the present invention is selected to be one h, where $h = \frac{1}{2}H$.

Figure 3:
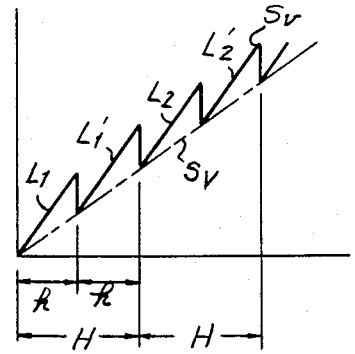
FIG. 3 is a waveform diagram of the vertical synchronizing signals of a double-scanning non-interlace television receiver in accord with the present invention.

FIG. 3 illustrates the waveform of the vertical synchronizing signals which perform a non-interlace scanning as described above. The curve indicated by the dotted lines and reference $S_V$ represents the waveform of the vertical synchronizing signal of a prior art television receiver. The curve indicated by the solid lines and reference $S_v$ represents the waveforms of the vertical synchronizing signal in a television receiver in accord with the present invention.

In a double-scanning non-interlace television receiver, where the scanning lines are scanned as described above, a question arises as to the signal which should be used for the interpolated scanning lines. The simplest and least expensive circuit arrangement for solving this problem is to use the previous scanning line for the interpolated scanning line.

When each scanning line is repeated to obtain a double-scanning non-interlace television receiver, objectionable flicker in the picture results as illustrated by FIGS. 1a and 1b. (FIG. 1c illustrates a luminance signal Y which changes from dark to light and is illustrated as extending in a direction perpendicular to the scanning lines.) In the figures, a white or bright point on the scanning lines of the picture screen is represented by a O mark, while a black or dark point on the scanning lines of the picture screen is represented by an X mark. As illustrated in FIG. 1a, the picture does not flicker since the dark and bright points do not vary on the scanning lines. However, as illustrated in FIG. 1b, the picture flickers because a point may be scanned as one brightness level during one scanning period, but be re-scanned during the second period as a different brightness level. For example, the point indicated by the X mark on line $L'_2$ is dark in the first scanning field, while the same point is light, as indicated by a O mark, when it is re-scanned as line $L_{265}$. The picture which results has objectionable flicker.

Figure 4:
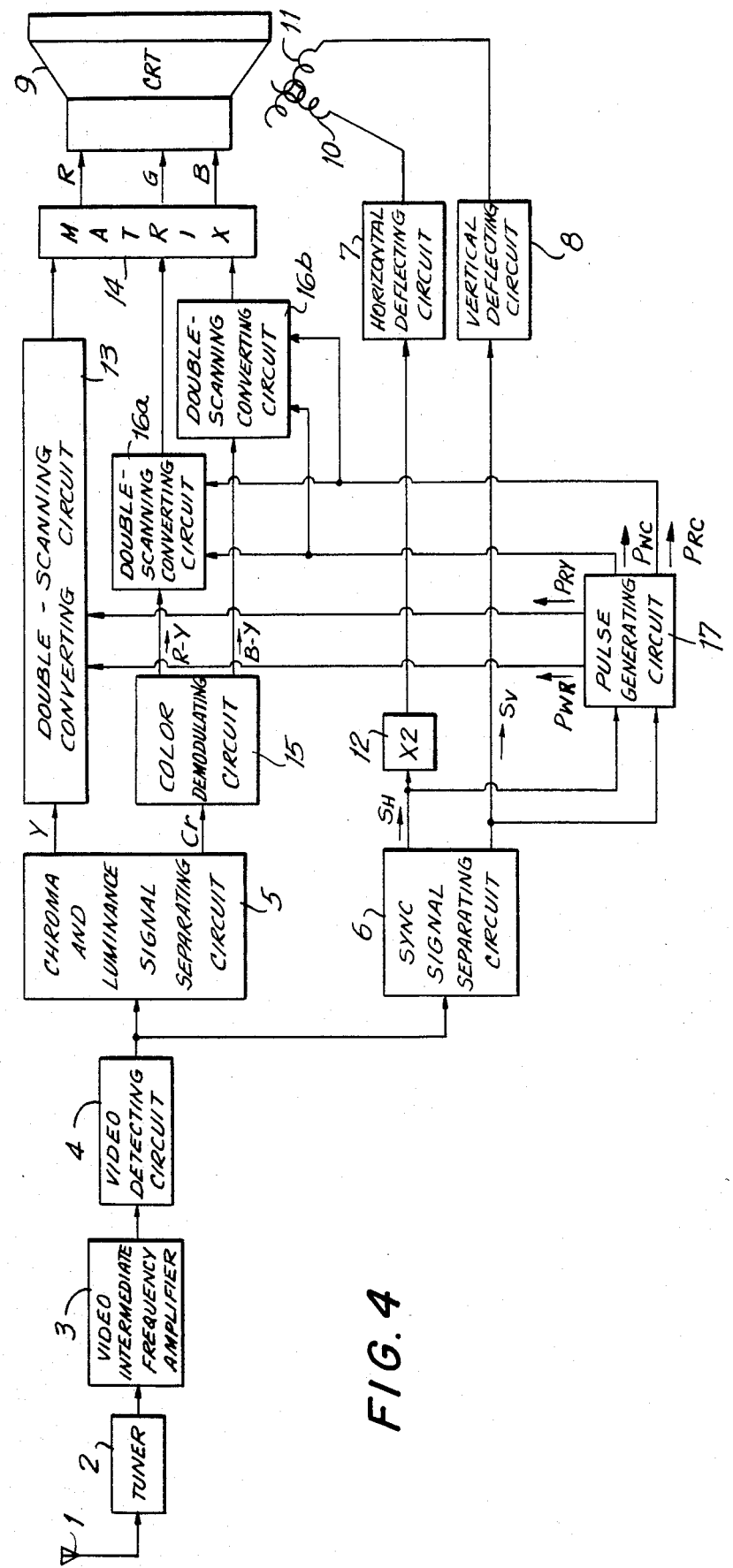
FIG. 4 is a block diagram of one embodiment of a double-scanning non-interlace color television receiver in accord with the present invention.

FIG. 4 illustrates an embodiment of a double-scanning non-interlace color television receiver in accord with the present invention. The television receiver includes an antenna 1, a tuner 2, a video intermediate frequency amplifier 3, a video detecting circuit 4, and a chroma and luminance signal separating circuit 5 for separating a luminance signal Y and a chroma signal Cr from the received television signal. A sync signal separating circuit 6 receives an output signal from video detecting circuit 4 and separates a horizontal synchronizing signal $S_H$ and a vertical synchronizing signal $S_V$ therefrom. A horizontal deflecting circuit 7 and a vertical deflecting circuit 8 are associated with a color cathode ray tube (CRT) 9 in conjunction with a horizontal deflecting coil 10 and a vertical deflecting coil 11. The aforedescribed components are analogous to those found in conventional television receivers.

Horizontal synchronizing signals $S_H$ from sync signal separating circuit 6 are supplied to a multiplying circuit or multiplier 12 which, in the illustrated embodiment, doubles the frequency of horizontal synchronizing signals $S_H$. The multiplied horizontal synchronizing signals from multiplying circuit 12 are supplied to horizontal deflecting circuit 7 so that the horizontal scanning is performed twice during one horizontal period of the received television signal. Vertical synchronizing signals $S_V$ from sync signal separating circuit 6 are supplied to vertical deflecting circuit 8, and can be in accord with the waveform of FIG. 3.

Luminance signal Y separated in chroma and luminance signal separating circuit 5 is supplied to a double-scanning converting circuit 13 which is connected to a matrix circuit 14. Chroma signal Cr from chroma and luminance signal separating circuit 5 is supplied to a color demodulating circuit 15 from which color difference signals R-Y and B-Y are produced. Color difference signals R-Y and B-Y are supplied to double-scanning converting circuits 16a and 16b, respectively, with the output signals therefrom being supplied to matrix circuit 14.

Horizontal and vertical synchronizing signals $S_H$ and $S_V$ are supplied as reference signals to a pulse generating circuit 17 which generates write signals $P_{WY}$ and read signals $P_{RY}$ which are supplied to double-scanning converting circuit 13, and write signals $P_{WC}$ and read signals $P_{RC}$ which are supplied to double-scanning converting circuits 16a and 16b. In the illustrative embodiment, the frequency of the write signals is twice the frequency of the read signals. If the frequencies of the signals $P_{WY}, P_{RY}, P_{WC}$ and $P_{RC}$ are designated as $f_{WY}, f_{RY}, f_{WC}$ and $f_{RC}$, respectively, the relations between the frequencies of the read and write signals are as follows:

$2f_{WY} = f_{RY}$ $2f_{WC} = f_{RC}$ In one embodiment, signals $P_{WY}$ and $P_{WC}$ have the same frequency, while signals $P_{RY}$ and $P_{RC}$ also have the same frequency.

The luminance scanning line signals from double-scanning converting circuit 13 and the chroma scanning line signals from double-scanning converting circuits 16a and 16b are supplied to matrix circuit 14 which generates color signals R, G and B for display on CRT 9.

As illustrated in FIG. 5, the television receiver of FIG. 4 displays luminance signal "a" and chroma signal "a₁" during the same scanning period. During the following scanning period, luminance signal ½ (a+b) is displayed with color difference signal "a'₁". During the following scanning period, luminance signal "b" is displayed with corresponding color difference signal "b₁". The color difference signals and the luminance signals are synchronized together in subsequent time periods. The synchronizing relationship between the luminance signals and the color difference signals can be adjusted by connecting phase shifting circuits (not shown) to double-scanning converting circuits 16a, 16b.

FIG. 6a illustrates the scanning lines on a television receiver in accord with FIG. 4 which is supplied with the luminance signals of FIG. 6b. As described herein, the luminance signal Y for the scanning line to be interpolated is the interpolated or mean value between the luminance signals of the scanning line immediately preceding and the scanning line immediately following the scanning line to be interpolated. As illustrated with respect to line $L'_2$ of FIG. 6a, an averaged scanning line signal (represented by a triangular mark) is generated from the preceding line, $L_2$, and from the following line, $L_3$. A point on $L_2$ represented by the X mark is a dark point. A point represented by the O mark on $L_3$ is a light mark. Accordingly, the triangular mark on line $L'_2$ represents a gray point, the average between the bright and dark points on lines $L_2$ and $L_3$. The corresponding point on line $L'_{264}$ is also represented by a triangular mark, indicating an averaged value, so that the picture represented by the scanning lines of FIG. 6a has significantly less flicker than the picture displayed in FIG. 1b.

Human vision is relatively sensitive to changes in brightness, but is relatively insensitive to changes in color, i.e., chromaticity. A television receiver in accord with the present invention utilizes these characteristics of human vision and uses an averaged value for the luminance or brightness characteristic of the picture to reduce flicker, and repeats the colors from the preceding lines for the interpolated lines, since human vision is not as sensitive to color changes. Thus, the television receiver circuit is relatively uncomplicated.

FIG. 7 illustrates one embodiment of a double-scanning converting circuit 13 for luminance signal Y. Luminance signal Y (hereinafter referred to as signal Y) is supplied to input terminal 20. Switch SW₁ alternately supplies signal Y to first and second memory units 21a, 21b. Each memory unit 21a, 21b can store therein signal Y for one horizontal period (1H). The output signals from memory units 21a, 21b are supplied to delay circuits 22a, 22b, respectively. The output signals of delay circuits 22a, 22b are further supplied to delay circuits 23a, 23b, respectively. Delay circuits 22a, 22b, 23a, 23b each delay an input signal by one-half of one horizontal period (h=½H). The output signals of memory units 21a, 22b are also supplied though switch SW₂ to an adding circuit 24. The output signals from delay circuits 23a, 23b are also supplied to adding circuit 24 through a switch SW₃. Adding circuit 24 supplies an output signal to dividing circuit 25 which, in the illustrative embodiment, divides the input signal by two.

The output signals from delay circuits 22a, 22b are also supplied to a switch SW₄. The output signal from dividing circuit 25 is supplied to one contact or terminal Y of a switch SW₅. A second contact or terminal X of switch SW₅ is connected to switch SW₄. Switch SW₅ is connected to output terminal 26. Switches SW₁ to SW₅ can be electronic switches with switching periods illustrated in FIG. 8, where the reference letters X, Y indicate the switching contacts, terminals or states of switches SW₁ to SW₅.

Figure 8:
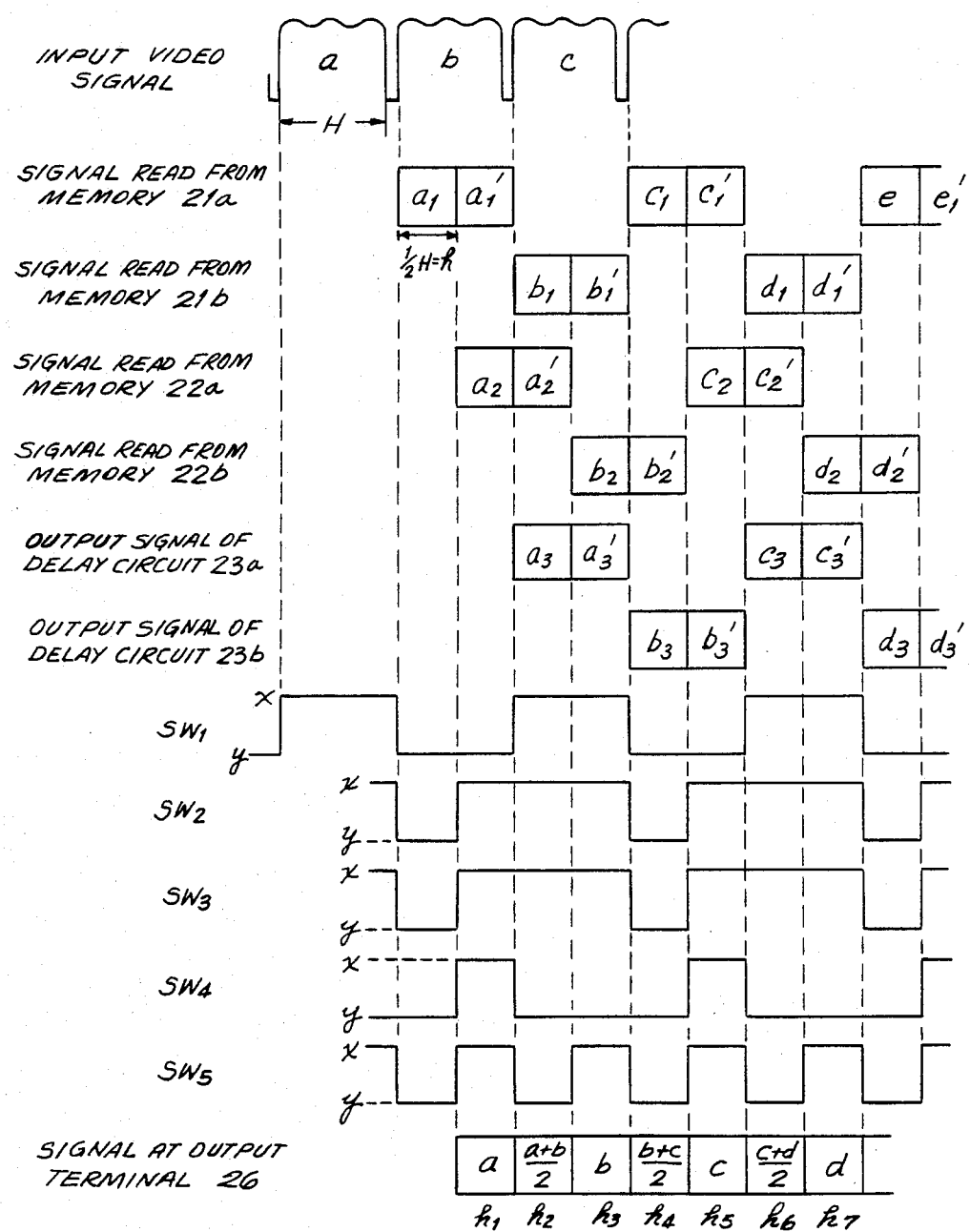
FIG. 8 are timing charts illustrating the operation of the double-scanning converting circuit of FIG. 7.

The operation of the double-scanning converting circuit of FIG. 7 will next be described with reference to FIG. 8. Reference letters "a", "b", "c", "d", ... in FIG. 8 represent signals consecutively supplied during horizontal periods 1H for the scanning lines in an ordinary television receiver. Signal Y supplied to input terminal 20 is alternately switched by switch SW₁ and stored in memory units 21a, 21b at every 1H period in accord with write signals $P_{WY}$. At the same time, memory unit 21b, 21a is in the read mode in accord with read signal $P_{RY}$. In the illustrated embodiment, read signals $P_{RY}$ have a frequency which is twice the frequency of write signals $P_{WY}$, so that the same signal stored in each of memory units 21a, 21b is read out twice during one 1H period. For example, Y signal "a" is read from memory unit 21a twice during one 1H period and identified as signals "a₁", "a'₁". (The signals "a₁" and "a'₁" of FIG. 8 are the same.) Signals "a₁" and "a'₁" are supplied to delay circuit 22a which supplies output signals "a₂" and "a'₂". Signals "a₂" and "a'₂" are further supplied to delay circuit 23a, which supplies output signals "a₃" and "a'₃". (In the notation of FIG. 8, the signal read out the second time is indicated by the primed designation.)

For ease of presentation in FIG. 8, the second half of the second scanning period (for example, the scanning period of scanning line $L_2$) in a conventional television receiver is indicated as period $h_1$, with the following scanning periods indicated as periods $h_2$, $h_3$, . . . .

During period $h_1$, switches SW₄ and SW₅ are switched to the X contacts so that signal "a₂" is supplied to output terminal 26. (In other words, the signal "a" from delay circuit 22a is supplied to output terminal 26.)

During period $h_2$, switch SW₅ is switched to the Y contact, so that the output signal from dividing circuit 25 is supplied to output terminal 26. Since switches SW₂ and SW₃ are both switched to their X contacts, the signal supplied to output terminal 26 is one-half the sum of the signal "b₁" from memory unit 21b and signal "a₃" from delay circuit 23a, i.e., $$\tfrac{1}{2}(b_1 + a_3) = \tfrac{1}{2}(a+b)$$

During period $h_3$, switch SW₄ is switched to the Y contact, with switch SW₅ switched to the X contact, so that signal "b₂" from delay circuit 22b is supplied to output terminal 26. (In other words, signal "b" appears at output terminal 26.)

During period $h_4$, switches SW₂, SW₃ and SW₅ are switched to the Y contacts. Output terminal 26 is thus supplied with an output signal which is one-half the sum of output signal "c₁" from memory unit 21a and output signal "b₃" from delay circuit 23b, i.e., $$\tfrac{1}{2}(c_1 + b_3) = \tfrac{1}{2}(b+c)$$

During period $h_5$, switches SW$_4$ and SW$_5$ are switched to their X contacts, so that the output signal "$c_2$" from delay circuit 22a is supplied to output terminal 26. (In other words, output signal "c" is supplied to output terminal 26.)

During period $h_6$, switch SW$_5$ is switched to its Y contact, with switches SW$_2$ and SW$_3$ switched to the X contacts, so that signal $\frac{1}{2}(c_3+d_1)$, or $\frac{1}{2}(c+d)$, is supplied to output terminal 26, where signal "$d_1$" is supplied from memory unit 21b and signal "$c_3$" is supplied from delay circuit 23a.

During period $h_7$, switch SW$_4$ is switched to its Y contact, and switch SW$_5$ is switched to its X contact, so that signal "$d_2$" or "d" from delay circuit 22b is supplied to output terminal 26.

As is evident from the above description, signals "a", "b", "c", "d", . . . produced at every other period 1h are averaged to produce signals $\frac{1}{2}(a+b)$, $\frac{1}{2}(b+c)$, $\frac{1}{2}(c+d)$, . . . which are generated and displayed between the above-listed signals.

Figure 9:
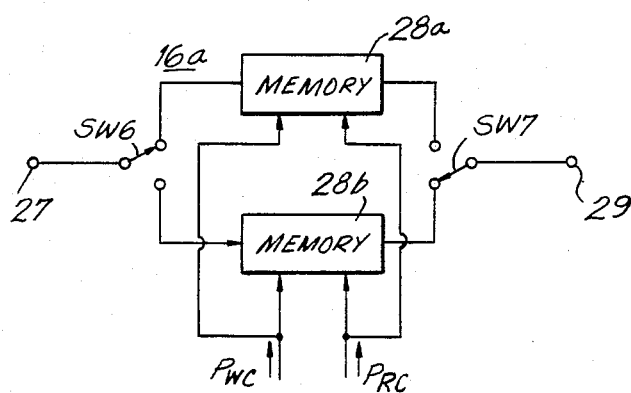
FIG. 9 is a block diagram illustrating a double-scanning converting circuit for the chroma signal derived from a color television signal.

FIG. 9 illustrates one embodiment of double-scanning converting circuit 16a, with double-scanning converting circuit 16b similarly constructed. Color difference signal (R-Y) or (B-Y) is supplied to input terminal 27. Switch SW$_6$ alternately supplies color difference signal (R-Y) or (B-Y) to memory units 28a, 28b at every 1H period where it is stored for one 1H period. Switch SW$_7$ alternately supplies the color difference signals read out from memory units 28a, 28b to output terminal 29. Switch SW$_7$ changes position at every 1H period. In one embodiment, switches SW$_6$ and SW$_7$ are electronic switches which are oppositely switched, so that when, for example, switch SW$_6$ is switched to the X contact, switch SW$_7$ is switched to the Y contact. As described hereinbefore, the signals stored in memory units 28a and 28b are read out twice as fast as the signals are stored therein during each 1H period. Switch SW$_6$ can, in one embodiment, be omitted.

Figure 10:
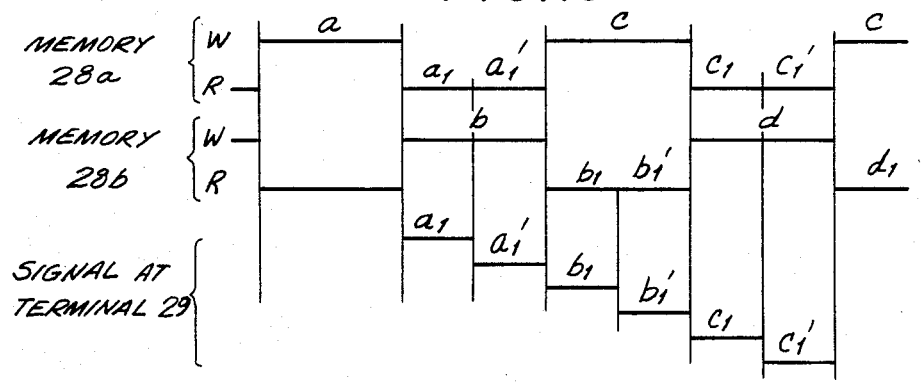
FIG. 10 are timing charts illustrating the operation of the double-scanning converting circuit of FIG. 9.

FIG. 10 illustrates the signals generated during the operation of the circuit of FIG. 9. The reference letters in FIG. 10 correspond to the same color difference signals as described hereinbefore with reference to FIG. 8. Thus, color difference signals "$a_1$", "$a'_1$", "$b_1$", "$b'_1$", "$c_1$", "$c'_1$", . . . are generated at output terminal 29, where the signals indicated by the primed designation represent the signals read out the second time from memory units 28a, 28b.

Figure 11:
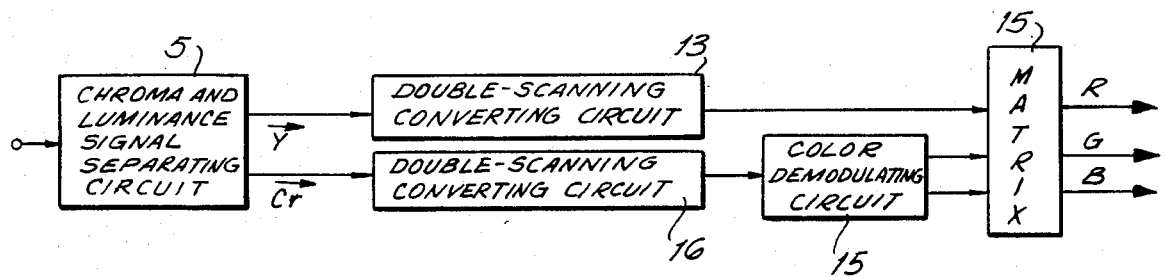
FIG. 11 is a block diagram illustrating an alternate embodiment of a double-scanning non-interlace color television receiver in accord with the present invention.

FIG. 11 illustrates an alternate embodiment of a color television receiver in accord with the present invention in which many of the components illustrated in FIG. 4 have been omitted for clarity. In FIG. 11, chroma signal Cr separated by chroma and luminance signal separating circuit 5 are first supplied to double-scanning converting circuit 16 where interpolated scanning line chroma signals are generated and supplied to color demodulating circuit 15. Color demodulating circuit 15 then generates color signals R, G, and B which are supplied to matrix circuit 14. As in the embodiment of FIG. 4, color signals R, G, and B are supplied twice as fast as the corresponding color signals in a conventional television receiver.

In the embodiment of FIG. 11, chroma signal Cr which undergoes a double-scanning conversion in double-scanning converting circuit 16 has a burst phase different from the burst phase used in a conventional television receiver. Nevertheless, two color difference signals can be produced by color demodulating circuit 15.

FIG. 12 illustrates an alternate double-scanning converting circuit 13, which circuit 13 includes memory units 21a, 21b which are comparable to the memory units described hereinbefore with reference to FIG. 7. Output signals from memory units 21a, 21b are alternately supplied through a switch SW$_8$ to adding circuit 30 and delay circuit 31. Switch SW$_8$ changes position at every 1H period. In the illustrated embodiment, delay circuit 31 delays signals supplied thereto for $\frac{1}{2}$H, or one h. The output signal from adding circuit 30 is supplied to a dividing circuit 32 which divides it by two and supplies it to an output terminal 33.

The operation of the circuit of FIG. 12 will now be described with reference to FIGS. 13a to 13g. Luminance signal Y (see FIG. 13a) separated by chroma and luminance signal separating circuit 5 is supplied to memory units 21a, 21b. FIGS. 13b and 13c illustrate the signal stored in memory units 21a, 21b, respectively. Reference letter W represents a write operation and reference R represents a read operation. Additionally, subscript one for the output signals of FIGS. 13b, 13c indicates a signal which is read out the first time, while subscript two indicates a signal which is read out the second time. FIG. 13d illustrates the output signal at point P of FIG. 12 (the output terminal of switch SW$_8$) FIG. 13e illustrates the output signal at point Q (the output terminal of delay circuit 31). FIG. 13f illustrates the output signal which appears at output terminal 33 from double-scanning converting circuit 13. FIG. 13g illustrates the color difference signals which correspond to luminance signals Y in each point in time which are supplied to matrix circuit 14. As described with reference to FIGS. 13b and 13c, subscript one indicates a color difference signal which is read out for the first time, while subscript two indicates a color difference signal which is read out the second time.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

What is claimed is:

1. A double-scanning non-interlace color television receiver for receiving an interlace color television signal having alternating odd and even fields of scanned lines which are normally interlaced, as displayed, comprising:

receiver means for receiving said interlace color television signal and including means for generating respective chroma and luminance scanning line signals in response thereto;

visual display means; and non-interlace converting means including luminance double-scanning means for generating an averaged luminance scanning line signal from each two consecutive luminance scanning line signals of the same field, and for supplying said consecutive luminance scanning line signals and said averaged luminance scanning line signal to said visual display means for display by the latter of each said averaged luminance scanning line signal between the respective two consecutive luminance scanning line signals, and means for supplying to said visual display means color difference signals derived from said chroma scanning line signal corresponding to one of said two consecutive luminance scanning line signals for display by said visual display means in synchronism with said averaged luminance scanning line signal.

2. The television receiver of claim 1, wherein said color difference signals are derived from said chroma scanning line signal corresponding to the first of said two consecutive luminance scanning line signals.

3. The television receiver of claim 1, wherein said non-interlace converting means includes:
color demodulating means for generating said color difference signals in response to said chroma scanning line signals; and
chroma double-scanning means for twice supplying to said visual display means said color difference signals from said color demodulating means corresponding to said one of said two consecutive luminance scanning line signals.

4. The television receiver of claim 3, wherein said color demodulating means generates R-Y and B-Y color difference signals; and wherein said chroma double-scanning means includes first and second chroma double-scanning circuits each associated with one of said R-Y and B-Y color difference signals.

5. The television receiver of claim 4, wherein each of said first and second chroma double-scanning circuits includes:
memory means for storing one of said color difference signals derived from each of the two chroma scanning line signals corresponding to said two consecutive luminance scanning line signals; and
means for alternately supplying said color difference signals stored in said memory means to said visual display means.

6. The television receiver of claim 5, wherein said memory means comprises first and second memory units each for storing one of said color difference signals derived from each of said two chroma scanning line signals, and said means for alternately supplying comprises switch means connected to said first and second memory units.

7. The television receiver of claim 6; and further comprising switch means for alternately supplying said color difference signals from said color demodulating means to said first and second memory units.

8. The television receiver of claim 3, in which said interlace television signal includes horizontal and vertical sync signals; and further comprising:
sync signal separating means for separating said horizontal and vertical sync signals from said interlace television signal; and
clock means for actuating said luminance and chroma double-scanning means in synchronism with said horizontal and vertical sync signals.

9. The television receiver of claim 8, in which said horizontal sync signals have a frequency; and wherein said visual display means includes horizontal and vertical deflecting means, and said non-interlace converting means includes frequency multiplying means for multiplying said frequency of said horizontal sync signals and for supplying the multiplied horizontal sync signals to said horizontal deflecting means.

10. The television receiver of claim 9, wherein said frequency multiplying means doubles said frequency of said horizontal sync signals.

11. The television receiver of claim 9, wherein said visual display means includes:
a color cathode ray tube; and
matrix means for generating red, green and blue color signals for display on said color cathode ray tube in response to said luminance scanning line signals and said color difference signals.

12. The television receiver of claim 1, wherein said non-interlace converting means includes:
color demodulating means for supplying said color difference signals to said visual display means in response to said chroma scanning line signals; and
chroma double-scanning means for supplying said chroma scanning line signal corresponding to one of said two consecutive luminance scanning line signals to said color demodulating means.

13. The television receiver of claim 12, wherein said chroma double-scanning means supplies the first of said two consecutive luminance scanning line signals to said color demodulating means.

14. The television receiver of claim 1, wherein said luminance double-scanning means comprises:
memory means for storing said two consecutive luminance scanning line signals;
delay means for delaying said luminance scanning line signals; and
averaging means for generating said averaged luminance scanning line signal in response to said luminance scanning line signals and said delayed luminance scanning line signals.

15. The television receiver of claim 14, wherein said averaging means comprises:
adding means for generating summed signals in response to said delayed luminance scanning line signals and said luminance scanning line signals; and
dividing means for dividing said summed signals.

16. The television receiver of claim 14, wherein said memory means comprises first and second memory units each for storing one of said two consecutive luminance scanning line signals; and further including:
first switch means for alternately supplying said two consecutive luminance scanning line signals to said first and second memory units; and
second switch means for selectively supplying said two consecutive luminance scanning line signals stored in said first and second memory units to said delay means and said averaging means.

17. The television receiver of claim 14, in which said luminance scanning line signals have a horizontal period; and wherein said delay means delays said luminance scanning line signals by one-half of said horizontal period.

18. The television receiver of claim 1, wherein said receiver means includes:
tuner means for tuning said interlace color television signal;
video intermediate frequency amplifying means connected to said tuner means;
video detecting means connected to said video intermediate frequency amplifying means; and
chroma and luminance signal separating means connected to said video detecting means for generating said interlace chroma and luminance scanning line signals.

19. A double-scanning non-interlace color television receiver for receiving an interlace color television signal having alternating odd and even fields of scanned lines which are normally interlaced, as displayed, comprising:

receiver means for receiving said interlace color television signal and including means for generating respective chroma and luminance scanning line signals in response thereto;

visual display means; and non-interlace converting means including luminance double-scanning means for generating an averaged luminance scanning line signal from each two consecutive luminance scanning line signals of the same field, and for supplying said consecutive luminance scanning line signals and said averaged luminance scanning line signal to said visual display means for display by the latter of each said averaged luminance scanning line signal between the respective two consecutive luminance scanning line signals, and means for supplying to said visual display means color difference signals derived form said chroma scanning line signal corresponding to one of said two consecutive luminance scanning line signals for display by said visual display means in synchronism with said averaged luminance scanning line signal, said luminance double-scanning means comprising memory means for storing said two consecutive luminance scanning line signals; first delay means for generating first delayed luminance scanning line signals in response to said luminance scanning line signals stored in said memory means; second delay means for generating second delayed luminance scanning line signals in response to said first delayed luminance scanning line signals; adding means for generating summed signals in response to said first delayed luminance scanning line signals and said second delayed luminance scanning line signals; and dividing means for generating averaged signals from said summed signals corresponding to the average of said two consecutive luminance scanning line signals.

20. The television receiver of claim 19, in which said luminance scanning line signals have a horizontal period; and wherein said first delay means delays said luminance scanning line signals by one-half of said horizontal period.

21. The television receiver of claim 20, wherein said second delay means delays said first delayed luminance scanning line signals by one-half of said horizontal period.

22. A double-scanning non-interlace color television receiver for receiving an interlace color television signal having alternating odd and even fields of scanned lines which are normally interlaced, as displayed, comprising:

receiver means for receiving said interlace color television signal and including means for generating respective chroma and luminance scanning line signals in response thereto;

visual display means; and non-interlace converting means including luminance double-scanning means for generating an averaged luminance scanning line signal from each two consecutive luminance scanning line signals of the same field, and for supplying said consecutive luminance scanning line signals and said averaged luminance scanning line signal to said visual display means for display by the latter of each said averaged luminance scanning line signal between the respective two consecutive luminance scanning line signals, and means for supplying to said visual display means color difference signals derived from said chroma scanning line signal corresponding to one of said two consecutive luminance scanning line signals for display by said visual display means in synchronism with said averaged luminance scanning line signal, said luminance double-scanning means comprising first and second memory means each for storing one of said two consecutive luminance scanning line signals; first switch means for alternately supplying said luminance scanning line signals to said first and second memory means; first and second delay means respectively associated with said first and second memory means for generating first and second delayed scanning line signals in response to said two consecutive luminance scanning line signals stored therein; third and fourth delay means respectively associated with said first and second delay means for generating third and fourth delayed scanning line signals in response to said first and second delayed scanning line signals, respectively; adding means for generating summed signals; second switch means for alternately supplying said luminance scanning line signals to said adding means; third switch means for alternately supplying said third and fourth delayed scanning line signals to said adding means; dividing means for generating averaged signals from said summed signals; fourth switch means for receiving said averaged signals; and fifth switch means for alternately supplying said first and second delayed scanning line signals to said fourth switch means.

\* \* \* \* \*